(12) United States Patent
Frank

(10) Patent No.: US 11,861,445 B2
(45) Date of Patent: Jan. 2, 2024

(54) ELECTROMAGNETIC COUPLER ARRANGEMENT

(71) Applicant: SATO HOLDINGS KABUSHIKI KAISHA, Tokyo (JP)

(72) Inventor: Markus Frank, Stråvalla (SE)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/910,442

(22) PCT Filed: Mar. 11, 2020

(86) PCT No.: PCT/EP2020/056555
§ 371 (c)(1),
(2) Date: Sep. 9, 2022

(87) PCT Pub. No.: WO2021/180319
PCT Pub. Date: Sep. 16, 2021

(65) Prior Publication Data
US 2023/0124090 A1    Apr. 20, 2023

(51) Int. Cl.
*G06K 7/10* (2006.01)
(52) U.S. Cl.
CPC ..... *G06K 7/10198* (2013.01); *G06K 7/10158* (2013.01)
(58) Field of Classification Search
CPC ........... G06K 7/10198; G06K 7/10158; G06K 7/0008; G06K 7/10316; G06K 17/0025
See application file for complete search history.

(56) References Cited

U.S. PATENT DOCUMENTS

| 8,700,375 B2 * | 4/2014 | Shirakawa | ............... H01Q 1/38 703/13 |
| 9,917,476 B2 * | 3/2018 | Hedberg | ............... H02J 50/005 |

(Continued)

FOREIGN PATENT DOCUMENTS

| JP | 2011-254413 A | 12/2011 |
| JP | 2013-511098 A | 3/2013 |

(Continued)

OTHER PUBLICATIONS

International Search Report dated Nov. 5, 2020, issued in counterpart Application No. PCT/EP2020/056555. (2 pages).

(Continued)

*Primary Examiner* — Seung H Lee
(74) *Attorney, Agent, or Firm* — WHDA, LLP

(57) ABSTRACT

A wireless electromagnetic coupler arrangement for reactive near field coupling comprising a sequential array of coupling elements which are geometrically arranged one- or two-dimensionally. By means of feeding an unmodulated wave of electromagnetic energy to each of the coupling elements and a respective associated harvester element, in an initial sensing state, an automatic selection of a single coupling element or plural coupling elements which establish a particularly strong and efficient interaction with an inlay is performed. By means of a respective feedback loop, a switchable array of resistances is used to activate the selected coupling element(s) for coupling of information to/from the loop and to de-activate the remaining coupling elements.

21 Claims, 4 Drawing Sheets

(56) References Cited

U.S. PATENT DOCUMENTS

| | | |
|---|---|---|
| 10,096,898 B2 | 10/2018 | Nikitin et al. |
| 11,329,697 B2 * | 5/2022 | Frank ................ G06K 7/10356 |
| 2010/0285746 A1 | 11/2010 | Tsirline et al. |
| 2011/0115611 A1 | 5/2011 | Tsirline et al. |
| 2013/0127605 A1 | 5/2013 | Beasley et al. |
| 2017/0005481 A1 | 1/2017 | Von Novak, III et al. |
| 2018/0254803 A1 | 9/2018 | Frank et al. |

FOREIGN PATENT DOCUMENTS

| | | |
|---|---|---|
| JP | 2013-530574 A | 7/2013 |
| JP | 2018-524963 A | 8/2018 |
| JP | 2018-538707 A | 12/2018 |
| WO | 2011/060300 A2 | 5/2011 |
| WO | 2017/088933 A1 | 6/2017 |

OTHER PUBLICATIONS

Office Action dated Sep. 5, 2023, issued in counterpart JP application No. 2022-554469, with English translation. (10 pages).

* cited by examiner

ELECTROMAGNETIC COUPLER ARRANGEMENT

FIELD

The present disclosure broadly relates to electromagnetic coupling technology. More specifically, a non-limiting embodiment relates to an electromagnetic coupler arrangement suitable for use in a printer for coding RFID inlays or other near field encoding applications.

BACKGROUND

Radio frequency identification (RFID) is a technology that uses radio waves to transfer data from electronic tags (known as RFID tags or RFID inlays). The information is stored electronically in the tag. For reading out the information, an RFID reader transmits an encoded radio signal to interrogate the tag. The RFID tag therefore includes a planar metallic trace, more specifically, a current loop suitable for inductive coupling. The same planar metallic trace (current loop) can also be used for encoding the RFID tag by means of electromagnetic coupling.

An RFID device that includes a planar metallic trace is usually referred to as an inlay. In particular, an inlay is an RFID device including a planar metallic trace film supported on a flexible substrate, which is connected to a transponder. The transponder, included in the current loop, is an integrated circuit for deciphering signals sent to the inlay and received by the planar metallic trace and also for sending a signal to the planar metallic trace, which is then transmitted by the planar metallic trace (sometimes also called "antenna"). The inlay antenna may be tuned (i.e. sized) to communicate at a certain target frequency with a transceiver, which includes at least a coupling element for communication with the RFID inlay and an interrogator. Regarding the term "antenna", for better understanding it is noted that within the present disclosure the term "antenna" is interpreted as meaning a radiating device. The present disclosure, however, relates to coupling in the reactive near field as opposed to the radiation far field. The usage of the term "antenna" has therefore been avoided in the present disclosure.

In recent years, printing devices have become known that enable dislocating an RFID inlay on a medium such as a sheet of paper, and at the same time, enable encoding the RFID inlay with the desired information during the printing process. The encoding is performed by means of electromagnetic coupling, preferably in the reactive near field. For this purpose, an RFID printer/encoder is provided with an electromagnetic coupler arrangement that fits in a cavity of the printer so as to couple electromagnetic power bearing the coding information into the RFID inlay which is located on the medium, while the medium is guided through the printer/encoder along a media path.

Coupler arrangements with only a single coupling element may be used, as well as those with a plurality of coupling elements forming a one- or two dimensional array.

A problem arises due to the need to encode different inlays with various geometries (form factors) efficiently and without substantive changes to the coupler arrangement.

The coupling element, whether it is in a single configuration making up the whole coupler or in an array configuration is generally a non-optimized design, since there is a vast variation of inlay geometries. In many cases, transmission line (TRL) technology is used for leakage field coupling from different TRL geometries. In other cases, a more antenna like radiating structure is used, at a cost of extensive shielding for radio frequency (RF) isolation. Regardless of which of the mentioned configurations is used, non-optimized coupling is achieved. One solution for geometry adaptation may then be the array configuration, with controlled excitation of the individual elements for optimized RF coupling field, so that the imperfection of the individual element is overcome.

However, this has the drawback that calibrations are needed in order to adapt the coupling arrangement to a particular inlay to be encoded, before an actual encoding can be performed. Either the positioning of the inlay for optimum coupling must be known or the inlay profile must be obtained and stored.

In the former ("static") case, each inlay type has its own unique required positioning, which cannot be changed for a fixed coupler. In the latter ("externally controlled adaptive") case, there is a need for a scanning functionality in order to know the inlay profile.

In the particular case of an array of electromagnetic coupling elements, a calibration step is initially necessary to be performed, for each inlay geometry, in order to determine (select) one or a limited plurality of elements of the array to be used (activated) for coupling power into this particular inlay type. In addition or at the same time, there is a need to determine the (relative) position between the inlay to be communicated with (in particular: be encoded) and the coupler arrangement. It is to be noted that in most cases it is further desirable to limit the space of efficient coupling (spatial selectivity), because the inlays are provided with small distances between each other. This should preferably be achieved without the need for extensive shielding structures which are space consuming and therefore often not suitable in a printer environment with only limited space.

SUMMARY

According to a first aspect, a wireless electromagnetic coupler arrangement for providing spatial selectivity in interaction with an RF terminated planar metallic trace of arbitrary geometric shape by means of electromagnetic energy is provided. The electromagnetic coupler arrangement comprises a sequential array of coupling elements shunted onto a phase compensated differential transmission line, for coupling the electromagnetic energy to the RF terminated planar metallic trace by means of reactive near field coupling. The electromagnetic coupler arrangement further comprises a plurality of switchable resistor elements being included in the paths between the differential transmission line and a respective one of the coupling elements forming the array, so as to alternatively switch the resistance of the electric connection between the differential transmission line and the respective coupling element to a first or second value, wherein the second value is smaller than the first value, by controlling a respective switch. Each of the coupling elements is associated with a respective harvester element for collecting energy that is fed from the differential transmission line and a respective feedback loop for providing feedback from the harvester element to the respective switch for switching the resistor elements included in the respective path based on the DC voltage established at the harvester element.

It is the particular approach of a non-limiting embodiment to provide a wireless electromagnetic coupler arrangement in form of a self-adaptive array of coupling elements. The arrangement is capable of selectively switching the resistance of the feeding path of each of the coupling elements forming the array between a high and a low value on the basis of a sensed interaction strength between each coupling element and an inlay present in the vicinity of the coupler arrangement. Thereby, out of the plurality of coupling elements only those which enable highly efficient coupling with the particular inlay are automatically activated, by switching the respective resistance to a low value. The other coupling elements are deactivated in order to concentrate the fed coupling energy on those coupling elements enabling the most efficient coupling. This is achieved by means of harvester elements connected to the feeding paths of each individual coupling element of the array. The harvester elements provide a feedback for switching the respective resistances based on a coupling strength between the coupling element and the inlay determined during an initial sensing phase of operation. Hence, spatial selectivity is automatically attained among coupling elements of an array interacting with a particular tag. This is achieved by automatically isolating (at least to a certain degree) those ones of the coupling elements which in a current situation (i.e. geometric alignment or shape of the tag) do not provide for an efficient interaction during a sensing state.

The approach as outlined may be realized by a wireless electromagnetic coupler arrangement according to the first aspect described above. In accordance with non-limiting embodiments, the wireless electromagnetic coupler arrangement comprises a sequential array of coupling elements, and, for each of the coupling elements, a respective plurality of switchable resistor elements, a respective harvester element and the respective feedback loop.

According to a non-limiting embodiment, the harvester element is connected to the feeding line (differential transmission line) together with the respective coupling element so that the resistances of the connection are switched together for the harvester element and the coupling element.

According to an alternative non-limiting embodiment, the harvester element is connected so that it is permanently coupled to the differential transmission line via an electric connection with the first (larger) resistance value. As will be detailed below, in this case smaller magnitudes of the low resistance value as compared to the large resistance value are possible in comparison to the former embodiment.

According to preferred non-limiting embodiments, the electromagnetic coupler arrangement further comprises an interrogator for feeding electromagnetic energy to be coupled to the planar metallic trace. Further preferably, the electromagnetic coupler arrangement further comprises a balun that is electrically coupled between the interrogator and the differential transmission line. The balun forms a differential transmission line input by splitting an output of the interrogator in two parts equal in amplitude and shifted by 180° in phase.

Also preferably, the interrogator is configured to feed unmodulated electromagnetic energy to the coupling elements in a sensing state. The unmodulated electromagnetic energy is an RF carrier wave guided by the differential transmission line, in which the resistances are initially switched to the first value, for all coupling elements of the array. Thereby, in the sensing state unmodulated electromagnetic energy is used in order to establish certain DC voltages at the harvester elements, depending on the strength of interaction between the respective coupling element and a planar metallic trace (inlay) that is present in the vicinity of the coupling element.

Further preferably, the interrogator is configured to subsequently modulate the RF carrier as a communication signal to the coupling elements. In accordance therewith, when a stable switching state has been established for each of the coupling elements on the basis of the sensing result of the sensing step, a modulated communication signal can be sent for encoding the inlay.

Still further preferably, the interrogator is therefore configured to feed the communication signal after a stable switching state of each of the switches has been established in view of the interaction between the unmodulated RF carrier and the RF terminated planar metallic trace.

In accordance with preferred non-limited embodiments, the differential transmission line is terminated. However, the termination of the differential transmission line is no mandatory feature. With a suitable phase compensation, alternatively a configuration can be achieved, wherein the termination of the differential transmission line can be omitted.

According to preferred non-limited embodiments, each of the coupling elements includes a transmission line loop for interacting with the RF terminated planner metallic trace by inductive coupling. The transmission line loop is a continuous transmission line of finite length formed into a loop so that two terminals thereof approach each other and are differentially fed through the differential transmission line. Such a configuration may also be called "differential transmission line loop" (DTLL).

Further preferably, the transmission line loop has a super elliptic shape geometry, in accordance with the parametric representation (in Cartesian coordinates x and y):

$$x=a|\cos \theta|^{2/m} \mathrm{sgn}(\cos \theta) \; y=b|\sin \theta|^{2/m} \mathrm{sgn}(\sin \theta)$$
$$a,b>0 \; m,n \geq 2 \theta \in [0,2\pi].$$

Here, parameters a (length) and b (height) determine the size of the loop. Parameters m and n determine the curvature.

According to alternative preferred non-limited embodiments, each of the coupling elements comprises a transmission line pattern of an elongated spiral planar shape for interacting with the RF terminated planar metallic trace by inductive coupling. The transmission line pattern of an elongated spiral shape is a continuous transmission line of finite length having an elongated spiral shape with terminals on both ends, wherein the terminals are located so that there is at least one winding of the transmission line in-between. More preferably, the continuous transmission line of finite length is wound around a fixed center point so that each winding comprises straight portions that are arranged parallel to each other. Such a coupling element enables an enhanced flexibility in achieving highly efficient coupling with inlays of various shapes. Because the arrangement of the coupling element is such that the current flows in the same direction in each of the parallel pieces of the conductor distributed on the surface of the coupler, a strong magnetic field is generated so as to be distributed over the whole surface of the coupler rather than only in the proximity of a single loop-shaped conductor. At the same time, the confinement of the magnetic field to the area of the coupler surface only is maintained so that selectivity is not affected.

According to a preferred non-limiting embodiment, the sequential array of coupling elements is of a one-dimensional geometric arrangement.

According to an alternative preferred non-limiting embodiment, the sequential array of coupling elements is of a two-dimensional geometric arrangement.

According to preferred non-limiting embodiments, the RF terminated planar metallic trace is an RFID inlay. Further preferably, the electromagnetic coupler arrangement is adapted to encode the RFID inlay by coupling electromagnetic power thereto.

According to preferred non-limiting embodiments, the resistance is switched to the first value when the DC voltage at the harvester exceeds a predetermined first threshold value. As will be detailed below, a high level of the DC voltage at the harvester is indicative of a case where there is no highly efficient interaction between the coupling element and an inlay. As indicated above, in that case, the coupling element should not be used for coupling (encoding). This is achieved by switching the resistance to the first (higher) value, thereby deactivating the respective coupling element for encoding the respective inlay.

Further, according to non-limiting preferred embodiments, the resistance is switched from the first to the second value when the DC voltage decreases below a predetermined second threshold value, wherein the second threshold value is lower than the first threshold value. This means that when starting from an initial high DC voltage value, upon an inlay approaching that has a highly efficient coupling with the coupling element, which leads to a decrease in DC voltage value, the respective coupling element is activated for coupling (encoding), by switching the resistance of the lower value.

Still further, according to non-limiting preferred embodiments, each of the feedback loops includes an inverting operational amplifier. By employing an inverting operational amplifier, a high DC voltage is converted into a state where the switch is powered "off", whereas a low DC voltage is converted into a state where the switch is powered "on". Thereby, a situation can be achieved wherein the switch status in case of a high DC voltage is the same as the initial switch status, before any power is fed to the system. This contributes to operational stability.

Also preferably, the coupler arrangement is employed in a printer, wherein RFID inlays to be encoded are arranged on a medium guided in the printer along a media path.

According to a non-limiting embodiment, an RFID printer/encoder comprising a multi-layer electromagnetic coupler arrangement according to the first aspect or any of non-limiting embodiments thereof is provided. Since the electromagnetic coupling for transferring coding information to an RFID inlay occurs in the reactive near field, the multi-layer electromagnetic coupler arrangement can be easily fitted into a printer cavity, in proximity to the media path.

The non-limiting embodiments disclosed broadly aim to provide an improved electromagnetic coupler arrangement that is applicable to couple electromagnetic power into inlays of arbitrary shape efficiently without the need for calibration or external control.

These and other aspects and features of non-limiting embodiments will now become apparent to those skilled in the art upon review of the following description of specific non-limiting embodiments in conjunction with the accompanying drawings.

BRIEF DESCRIPTION OF THE DRAWINGS

Additional features and advantages of non-limiting embodiments will become apparent from the following description as illustrated in the accompanying drawings, wherein.

DETAILED DESCRIPTION

Figure 1:
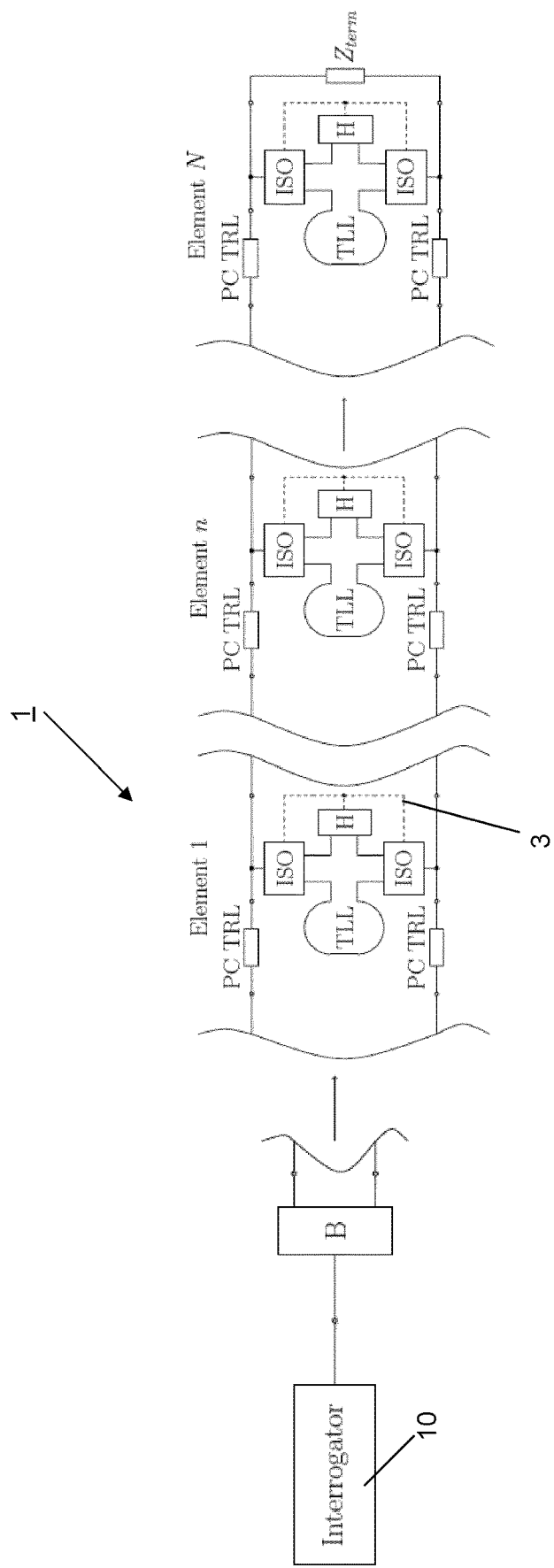
FIG. 1 is a block diagram of an electromagnetic coupler arrangement in accordance with a non-limiting embodiment.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The present disclosure relates to an electromagnetic coupler arrangement comprising a self-adaptive array of coupling elements for enabling a selective and highly efficient coupling of electromagnetic energy into planar metallic traces of arbitrary shape, in particular, for encoding RFID inlays. The non-limiting embodiments disclosed are particularly suitable for encoding inlays which are provided on a medium such as in an RFID printer/encoder.

In non-limiting embodiments of the electromagnetic coupler arrangement an interrogator (sometimes also called "RFID reader") is connected via a balun to a transmission line, thereby transforming the transmission line into a differential transmission line having two portions being fed with an output of the interrogator with equal amplitudes and phases shifted by 180°. A sequential array of coupling elements is shunted onto the differential transmission line. Between the connections of the individual elements of the array to the transmission line, it is provided for phase compensation so as to obtain a phase compensated differential transmission line.

Between the phase compensated differential transmission line and each coupling element, a plurality of switchable resistor elements are foreseen so as to alternatively switch the resistance of the electric connection between the differential transmission line and the respective coupling element between a first (higher) and a second (smaller) value by operating a respective controllable switch. Further, an output terminal of the plurality of switchable resistor elements is connected with a harvester element that is further connectable to the respective coupling element. Thereby, the harvester element collects energy that is fed from the phase compensated differential transmission line to the respective coupling element.

The harvester element collects energy when the device is powered and thereby converts RF power fed into the system into a DC voltage. The harvester element is coupled via a feedback loop to the respective controllable switch of the respective plurality of switchable resistor elements.

A harvester element ("power harvester") and the operation thereof is as such well-known in the art. A detailed description thereof is therefore herein omitted. For further explanations, reference is made, for instance, to the article "Self-Reconfigurable RFID Reader Antenna", by Pavel Nikitin, IEEE RFID Conference, May 9-11, 2017 (cf. also patent publication U.S. Pat. No. 10,096,898 B2).

The goal to be achieved with the above described structure is to selectively activate communication only between a part of the plurality of couplers forming the array and an inlay (transponder) present in the vicinity of the array. More specifically, only one (or several) of the coupling elements are to be activated which allow for a highly efficient communication with the particular inlay (transponder) having a specific geometry.

For this purpose, the arrangement is initially set into a sensing state for sensing which of the couplers of the array provide for the most efficient coupling and are therefore to be activated. In accordance with the sensing result, the desired couplers are automatically activated (by switching the controllable switch so as to set the resistance between the phase compensated differential transmission line and the coupling element to the reduced (second) value). The resistance values of the remaining couplers are still switched to the high (first) value, so that only minimal interaction with the transponder is possible.

In accordance with non-limiting embodiments, the sensing state is established as follows. At the beginning, when the interrogator is switched on, all resistors of the array are switched to the first (high) value. The interrogator then powers the system by feeding an (unmodulated electromagnetic) wave towards the differential transmission line. While being fed through a path with the first resistance value, the DC voltage established at each of the harvester elements gradually increases. However, the switches are not triggered by the increasing DC voltages. This can, for instance, be achieved by including an inverting operational amplifier into the feedback loop so that the switching state at the time of an increasing voltage remains the same as in a non-powered state at the beginning, i.e. being switched to the first value.

As soon as a transponder (inlay) is present in the vicinity of the coupling elements, an interaction between the coupling elements and the transponder begins and leads to a mismatch and thus to an impedance change in the respective element of the array. This affects the DC voltage at the harvesting element. In particular, the higher the amount (efficiency) of interaction between a particular coupling element and the transponder, the lower the DC voltage at the harvester becomes. Specifically, in case of a certain strength of interaction, the DC voltage falls below a predetermined threshold ("second threshold"). This means that the respective switch is powered through the feedback loop and the resistance value of the respective element of the array is switched to the second (lower) value, with the result that the amount of energy powering the respective coupler element of the array is raised. In other words, the respective coupling element is activated due to the highly efficient interaction between the transponder and the coupling element, which leads to a decrease of the DC voltage at the harvester below the second threshold.

It is an important property of the arrangement according to the present disclosure that in the above described sensing state the individual coupling elements are well isolated. Due to the isolation in the sensing state, destructive interference when all coupling elements are active is avoided.

Further details of the operation will be described below, in accordance with individual embodiments of the arrangement of the switchable resistors. In particular, in the activated state, the DC voltage may be caused to rise again so as to exceed the higher first threshold, with the result that the respective feeding path is again deactivated, by switching the resistance to the first value. Preferably, the arrangement is constituted so that for each coupling element, in the presence of a particular inlay, a certain switching state is reached so as to remain stable.

However, generally speaking, it may be said that only one or a few of the coupler elements of the array (those which have a sufficient amount of interaction to have the voltage decrease below the second threshold) are automatically switched into the active state with low value resistors, whereas the others will be set inactive by having the respective switches powered off. In this state, the actual communication with the inlay is performed by feeding the system as a modulated signal, in order to write (or read). The other couplers, for which the resistances of the respective feeding paths are set to the first value, will not be able to perform communications with sufficient efficiency, so that the communication concentrates on those coupler elements which are "activated".

By thus providing a self adaptive array of coupling elements, highly efficient communication with transponders (tags, inlays) of various shapes and geometry is flexibly enabled without the need to know or determine an exact location of an individual transponder.

In the following, further details of non-limiting embodiments will be described with reference to drawings.

FIG. 1 is a block diagram providing a system overview of an electromagnetic coupler arrangement 1 according to a non-limiting embodiment.

The electromagnetic coupler arrangement comprises an interrogator 10, a balun B, and a plurality of sequentially coupled elements (Element 1, . . . Element n, . . . Element N) of a phase compensated differential transmission line PC TRL. "Sequentially coupled" means a sequential electric coupling of the individual elements to the differential transmission line, which must be distinguished from the geometric shape, which may, for instance, represent a one-dimensional or two-dimensional array. For simplification, further elements arranged between the elements explicitly shown in the drawing and arranged between the wavy lines have been omitted. Further, the drawing has been broken between the balun and Element 1. To each of the elements, a coupling element TLL is coupled via switchable resistors ISO, together with a respective harvester element H. The switches for switching the resistance value are included in box ISO. Non-limiting embodiments of the arrangement will be described in more detail below with reference to FIGS. 2 and 3. The feedback loops 3 from each of the harvester elements to the respective switches are indicated with dashed lines.

More specifically, the interrogator 10 is adapted to feed electromagnetic energy (in the form of an unmodulated wave or a modulated wave representing a signal) to power the system, which is indicated by a single line extending from the interrogator 10 to the balun B. The balun splits the electromagnetic wave (signal) into two waves (signals) of equal amplitude and with a phase shift of 180°. Thereby, the balun B converts the transmission line extending from the interrogator into a differential transmission line. This is indicated by the two parallel lines forming the differential transmission line, onto which the coupling elements TLL and the harvesters H are shunted via the switchable resistors ISO. Between each of two elements of the differential transmission line, phase compensation for the respective electrical length is provided, which converts the differential transmission line in a phase compensated differential transmission line PC TRL. This is indicated by the boxes labeled "PC TRL" in the drawing. It is further noted that in the preferably used copper transmission lines, high-frequency (radio frequency RF or ultra-high-frequency UHF) losses are quite small.

According to a non-limiting embodiment a frequency range of operation is about 860 to 960 MHz (Megahertz).

In the drawing of FIG. 1, the phase compensated differential transmission line is terminated behind element N (on the right-hand side of the drawing) by means of a terminating impedance $Z_{term}$. The terminating impedance serves for compensating mismatches along the differential transmission line. The presence of the termination is, however, optional, and, depending on the system parameters, an un-terminated differential transmission line is within the scope of the present disclosure. For instance, in an exemplary case of 32 switching elements sequentially coupled to the single balun B, a good matching may be achieved without providing the terminating impedance.

Generally speaking, the switchable resistors ISO force the coupling elements to alternatively be connected more strongly or more weakly to the RF path of the PC TRL. The inlay transponder impedance acts as a load when the inlay interacts electromagnetically with the coupling element. In the absence of an interacting inlay, the resistance of the coupling element is high. During the presence of an inlay (not shown in the drawing) interacting with the coupling element, when the coupling element is strongly connected the coupling element is in a loaded state, and when the coupling element is weakly connected the coupling element is in an isolated state. The isolated state is the default state. A trigger to change from the isolated state to the loaded state is achieved by electromagnetic interaction between the inlay, when it is present, and the respective coupling element. If a coupling element is sufficiently close to the inlay, there will be strong electromagnetic interaction, and the coupling element will trigger. The trigger locks the respective coupling element(s) to the loaded state as long as the inlay remains present. The internal harvester-based control feedback loop 3 cannot be externally interfered with and whether or not a coupling element is triggered is not monitored outside the coupling element.

Regarding the geometric dimensions, it is noted that the label size of an individual label is generally smaller than the geometric size of the self-adaptive array of coupling elements. In other words, the processing for activating only a single one or a portion of the coupling elements forming the array (sub-array activation) is foreseen for short pitch applications.

The size of the array (number of coupling elements in the coupler arrangement) is generally not limited. Typical values may be 8, 16 or 32, but without being limited to these. Out of the coupling elements of the array, a single one or a few (such as two or three) may be activated in the self-adaptive sensing procedure for a particular inlay shape and arrangement (position and orientation). However, the number of activated coupling elements is not limited to the above non-limiting examples either and, moreover, cannot even be foreseen in a particular situation, because it depends on the interaction parameters of each particular inlay with each coupling element, which are not externally controlled or communicated to the outside.

Figure 3:
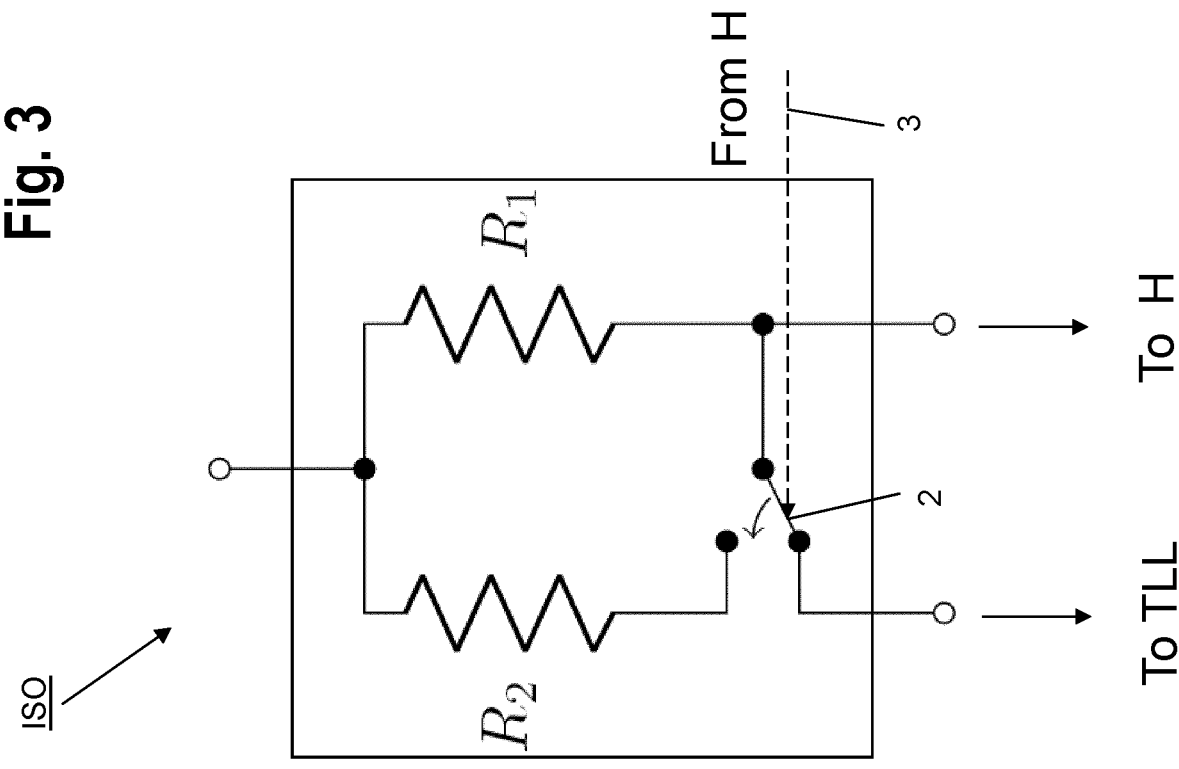
FIG. 3 is a simplified illustration of an arrangement of switchable resistor elements as employed in another of non-limiting embodiment.
Figure 2:
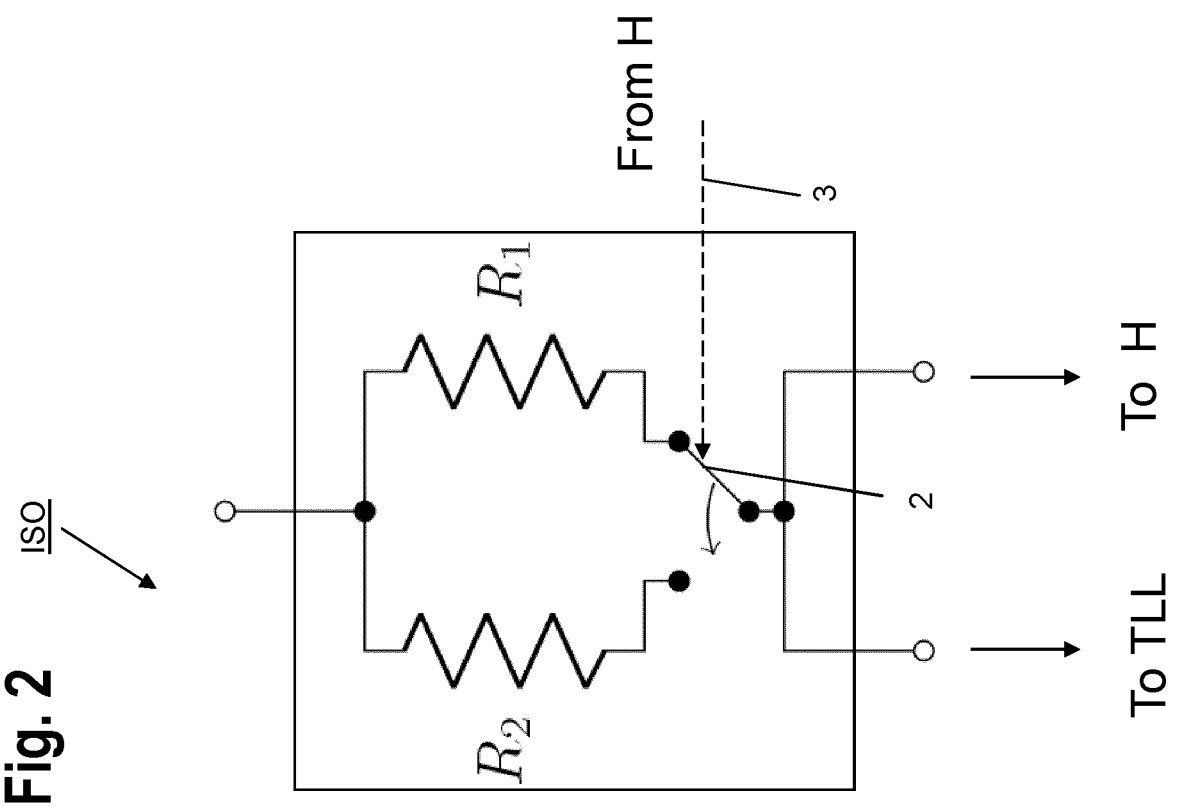
FIG. 2 is a simplified illustration of an arrangement of switchable resistor elements as employed in one non-limiting embodiment.

In the following, we shall explain the operation of the coupler arrangement in more detail and with reference to non-limiting exemplary arrangements of circuitry in the boxes labeled ISO in FIG. 1, which are illustrated in FIGS. 2 and 3.

FIG. 2 shows an exemplary arrangement of circuitry in the box "ISO" in accordance with a non-limiting embodiment.

In accordance therewith, the electric input path splits into two parallel paths characterized by having different resistances, illustrated in the form of different resistors $R_1$ and $R_2$. In accordance with the convention used in this specification, the resistance value of the first resistor, $R_1$, is larger than the resistance value of the second resistor, $R_2$. A switch 2, arranged at an output side of the box, enables switching between the two parallel paths. The common output splits into two terminals for connecting the harvester on the one side and the coupling element on the other side. Operation of the switch is controlled by a signal that is provided through the feedback loop 3 from the harvester element H. This is indicated by the dashed line in the drawing.

As a skilled person is aware, an obvious modification of the illustrated configuration is possible and does not affect the operation. In accordance with the obvious modification, the switch 2 is arranged not on the output side of the parallel circuit with the two resistors $R_1$ and $R_2$ but on the input side. It is further noted that for the connection of the harvester and the coupling element to the differential transmission line, two identical arrangements ISO as shown in FIG. 1 and illustrated in detail in FIG. 2 are connected in each section (element) of the phase compensated differential transmission line.

In the following, the operation for automatically reaching a stable activation status of an individual coupling element in the presence of a particular inlay will be described.

At the beginning, i.e. before feeding of energy from the interrogator 10 starts, the system is in a default state, wherein the resistances in all electric paths are switched to the (larger) first value, $R_1$. Preferably, the arrangement is such that this corresponds to a non-powered state of switch 2. Subsequently, the feeding of an unmodulated electromagnetic wave begins (sensing state). In this state, and as long there is no inlay present in the vicinity of a coupling element TLL, the coupling element TLL has quite a high resistance in itself, and thus despite the switchable resistance as the larger value $R_1$, the harvester element H collects energy so as to establish a high-level DC voltage. This does not trigger any change in the switching state. In the preferred embodiment, wherein the feedback loop 3 comprises an inverting operational amplifier, a high DC voltage is converted to a low level feedback signal, so that the switch 2 remains non-powered.

When an inlay approaches, electromagnetic interaction between the inlay and the coupling element TLL leads to a decrease in the DC voltage at the harvester element H, as generally explained above. The decrease in the DC voltage is more considerable (i.e. the resulting DC voltage is the smaller) the more intensive (more efficient) the electromagnetic interaction is. In accordance therewith, if there is highly efficient interaction between the inlay of a particular type and a particular one of the coupling elements TLL of the array, the DC voltage decreases below a predetermined threshold value (second, lower, threshold value), which triggers the switch 2. In the particularly preferred embodiment with the inverting operational amplifier, a low level DC voltage is converted into a high level feedback signal, so that switch 2 is powered. Accordingly, the respective electric path through the switchable resistance element is switched to the lower value resistance, $R_2$. This corresponds to an activation of the respective coupling element TLL and enables highly efficient interaction of that particular coupling element with the inlay. On the other hand, if the interaction between the inlay and another coupling element TLL is less efficient (for instance, due to a different relative geometric configuration), there is less decrease in the harvester DC voltage (i.e. the DC voltage level remains higher), it does not fall below the predetermined (second) threshold value, and the switch 2 is not triggered. Consequently, in such a case, the resistance of the electric path between the differential transmission line PC TRL and the coupling element TLL remains large ($R_1$) and the coupling element TLL is thus in a deactivated state, wherein no efficient interaction between the coupling element TLL and the inlay is possible.

In case of an activation, as a further consequence of the small electric resistance $R_2$, the DC voltage at the harvester H again rises. When the predetermined first (higher) threshold value is exceeded, this leads to triggering the switch 2 to switch back to the higher electric resistance, $R_1$.

It must be borne in mind that a situation should be avoided wherein due to the above described behavior there is a permanent switching between the two switching states of switch 2, in short time periods. In other words, this would be an unstable situation, so that no efficient coding would be possible. Rather, the "activated" switching state should remain at least for a period of time that is sufficiently long in order to subsequently feed and process a modulated signal for coding the inlay. In order to achieve this, it is important that there is not too large a difference between the two resistance values, $R_1$ and $R_2$. More specifically, the ratio of the resistance value of the parallel combination of the TLL and the harvester to the sum of the resistance values of $R_2$ and the TLL-harvester parallel combination after the switch 2 has been triggered (when the inlay is present) must be strictly smaller than the respective ratio of the resistance value of the TLL-harvester parallel combination to the sum of the resistance values of $R_1$ and the TLL-harvester parallel combination before the inlay is present. On the other hand, this means that even in the case of the non-activated switching status ($R_1$), there is still some interaction possible, so that even the "not activated" coupling elements TLL may contribute to the communication. In practical implementations, possible orders of magnitude may, for instance, be $R_1=1000\Omega$ (Ohm) and $R_2=600\Omega$. Of course, these particular values are purely exemplary and for illustrative purposes and the present disclosure is by no means limited to these or similar values.

FIG. 3 shows an exemplary arrangement of circuitry in the box "ISO" in accordance with another non-limiting embodiment.

In this embodiment, the electric path is split between two parallel paths having resistance values $R_1$ and $R_2$ in a similar manner as in the embodiment of FIG. 2. However, the connection of the harvester element H is different. More specifically, the harvester element H remains permanently connected to the electric path with the higher resistance, $R_1$. This is achieved by arranging the switch 2 at a position behind the terminal to which the harvester element H is connected, in the current flow from the phase compensated differential transmission line PC TRL towards the coupling element TLL. Thereby, only the connection between the differential transmission line PC TRL and the coupling element TLL is switched, whereas the connection to the harvester element H remains unaffected by the switching. The feedback loop 3 is again indicated by means of a dashed line. As can be seen from the drawing, there is a short circuited connection between the harvester element H and the coupling element TLL when the switch 2 is on the side of resistor $R_1$. However, when switch 2 is switched towards resistor $R_2$, the galvanic connection between harvester H and coupling element TLL is interrupted.

The operation of the embodiment is generally similar to that of FIG. 2. In the same manner as described above, in the initial (non-powered) state, the switching position is towards the first (larger) resistance value, $R_1$. Accordingly, in the sensing state, when electric energy in form of an unmodulated wave is fed, a high-level DC voltage is established at the harvester element H, in the same manner as in the embodiment of FIG. 2.

When an inlay becomes present in the vicinity of the array of coupling elements TLL, this again leads to a decrease of the level of the DC voltage, depending on the strength (efficiency) of interaction. In case of highly efficient interaction, the DC voltage level decreases below the second (lower) threshold. Up to this point in time, the operation is the same as in the embodiment of FIG. 2, because the electrical connections are the same.

More specifically, as long as the switch 2 is in the switching position connected to the higher resistance value $R_1$, there exists a short-circuited connection between the coupling element TLL and the harvester element H. As a consequence, a situation of good matching (resonance condition) may be established in the circuit part comprising the (mainly inductive) coupling element and the (mainly capacitive) harvester element, without presence of an inlay. When an inlay becomes present, the situation is still the same as in the embodiment of FIG. 2. The electrical path between the differential transmission line PC TRL and the coupling element TRL is again switched to the lower value $R_2$, i.e. the respective coupling element TLL is activated. However, after the switch 2 is triggered the situation is different from the embodiment of FIG. 2. In the case of the embodiment of FIG. 3, the resonance condition is interrupted by the triggered switch 2. The harvester element remains out of a resonance circuit. Consequently, no fast rising of the DC voltage at the harvester element H is to be expected or the DC voltage may drop even further.

In consequence, the activated status remains stable, even in the case of a very low second resistance value $R_2$ (one or even several orders of magnitude smaller than $R_1$) so that from a practical point of view the electric path between the differential transmission line PC TRL and the coupling element TLL may be considered to be almost short-circuited.

In case of an insufficient interaction strength (efficiency) between the inlay and the coupling element TLL, when the DC voltage level at the harvester element H does not fall below the predetermined (second) threshold value, the switch 2 is not triggered and the situation remains the same as in the embodiment of FIG. 2, i.e. the respective coupling element TLL is not activated.

Thus, by means of the embodiment of FIG. 3, and in case of using resistance values of different magnitude (so that $R_2$ is much smaller than $R_1$), a better selectivity and improved stability can be achieved. On the other hand, the contribution of the non-selected (not activated) coupling elements TLL to coupling is in that case negligible.

It is worth mentioning that again, two respective boxes labeled ISO having the structure illustrated in FIG. 3 or any functionally equivalent structure are arranged per section (element) of the phase compensated differential transmission line PC TRL in order to establish the feeding connection for the respective coupling element TLL being shunted onto the differential transmission line.

The differentially fed coupling element TLL may be one of various geometric arrangements, shapes etc. Some exemplary and non-limiting embodiments will be described in more detail below with reference to the drawings of FIGS. 4 to 6.

In accordance with preferred non-limiting embodiments, the structures as explained below, serving as coupling elements TLL in an electromagnetic coupler arrangement according to the present disclosure, are generally embedded in a multi-layer structure (using one of well-known microstrip or strip line technologies) comprising the feeding layer, a metallic ground plane layer and the top surface layer to be arranged closest to the terminated planar metallic trace (inlay to be encoded). The top surface layer comprises the coupling elements, examples of which will be explained in more detail below. It is noted that although the reference label "TLL" (for: "transmission line loop") is generally used for the coupling elements throughout the present disclosure, this does not imply any limitation of the structure of suitable coupling elements, in principle.

In typical arrangements, there is only a small distance between the top surface layer (coupling elements) and the planar metallic trace (inlay) to be coupled, in the order of about 1 mm, or between 0.5 mm and 1.5 mm, without being limited to that range.

A typical size of an inlay may be in the order of 4" (inches), i.e. approximately 100 mm (millimeters), conforming to 4" wide media used in bar code printers. More compact inlay designs also exist, being in the order of 30-50 mm, which are compatible with narrower media widths.

Figure 4:
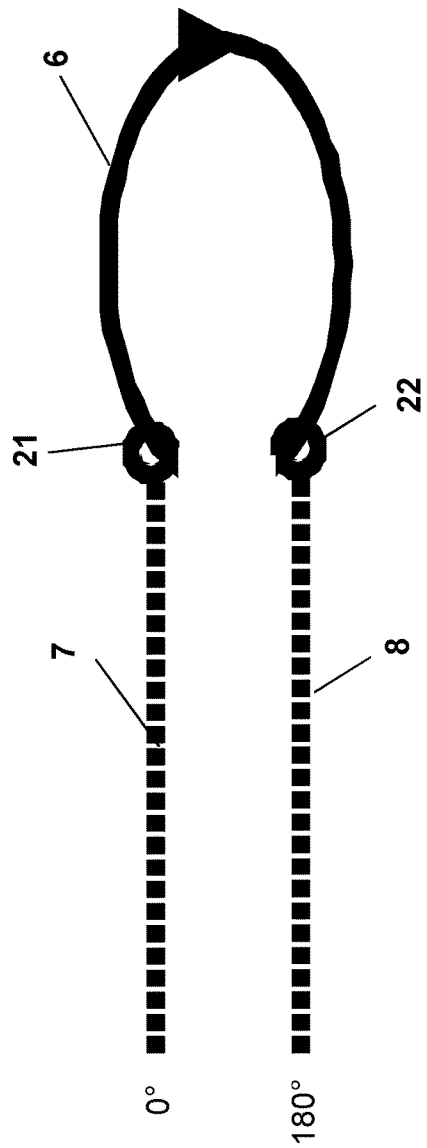
FIG. 4 is a simplified functional illustration of a differential transmission line loop as employed as a coupling element in a non-limiting embodiment.

FIG. 4 is a simplified functional illustration of a first example of a coupling element, which will be called "Differential Transmission Line Loop" (DTLL). The coupling element is constituted of a continuous transmission line (which may, for instance, be manufactured in the microstrip technology), which is shaped so as to form an (almost) closed loop 6. The open ends of the loop 6 constitute terminals 21 and 22 that are fed with signals 7 and 8 (illustrated in form of dashed lines), having a phase difference of 180° with respect to each other. As was explained above with reference to FIG. 1, signals 7 and 8 are output by a balun, as a result of splitting an input signal into two signals of equal amplitude and inverted phase, and fed via phase compensated differential transmission line PC TRL and the shunted connection as described in more detail above with reference to FIGS. 1 to 3.

As a consequence of the differential feeding, the direction of the current flowing in the loop 6, illustrated by an arrow in the loop, can be the same throughout the loop (at a given instance of time).

The design of the coupling element as a continuous transmission line loop, representing a distributed field theoretic component, can be performed without the consideration of matching. On the contrary, if discrete components were to be included at intermediate locations in the loop structure, for the purpose of input matching, unnecessary iteration would be needed between field theoretic coupling optimization and component value optimization. Thus a continuous transmission line loop offers a considerable design advantage as compared to mixing distributed and discrete components inside the coupling structure. For appropriate functioning, the DTLL must be arranged so as to oppose a ground plane (not illustrated). In accordance with a non-limiting embodiment, all discrete components are arranged on the feeding side, or balun side of the arrangement, that is, the opposite side of the ground plane relative to the coupling element.

Hence, a non-limiting embodiment facilitates firstly (and independently) optimizing the geometry of the transmission line loop and secondly, after the geometry of the transmission line loop has been optimized, performing the impedance matching on the balun side, by choosing appropriate electric components. The balun has three functional properties. The first property consists of splitting the input signal into two parts equal in magnitude. The second property consists of shifting the two parts 180° apart in phase. The third property consists of an impedance transformation from a non-differential impedance of an external feeding system interface, such as, for example, 50Ω, to a differential impedance level, as seen at the input of the loop. In other words, the balun according to a non-limiting embodiment may be regarded as including a transformer and designated as a "balun transformer" since it also fulfils the third function of impedance transformation. The impedance transformation is generally characterized by the impedance transmission ratio k. In the case relevant for a non-limiting embodiment, wherein a non-differential impedance is transformed into a differential impedance, k equals twice the ratio of the differential impedance value (at the input of the DTLL) and the non-differential impedance value (of the external feeding system interface). In case of a 50Ω external feeding system, and assuming the differential impedance level at the input of the loop to be 500Ω, the impedance transmission ratio would be k=5.

Generally, the balun "sees", at its output, a high reactive impedance (or high Q-value), which is due to the inductive character of the transmission line loop and the presence of the ground plane. By including the respective electric components, said impedance is matched with the impedance on the feeding side.

A high Q-value (high value of the Q-factor or quality factor) corresponds to a highly efficient inductive coupling but at a reduced bandwidth, since the Q-factor generally expresses the relation of the resonance frequency of a circuit to the bandwidth (half power bandwidth). This means that the range of frequencies where it is possible to deliver power with high efficiency is limited. Therefore, the matching is preferably made in a way that reduces the Q-value to a certain acceptable extent. This can be done, for instance, by including an internal resistor, at the output of the balun. This is possible, taking into account the potentially very high coupling factors that can be achieved between the differentially fed transmission line loop and the inductive loop of an inlay at a single frequency, where some reduction in delivered power to the transponder chip is accepted, with a still overall high coupling factor exhibited by the DTLL over the desired bandwidth.

Figure 5:
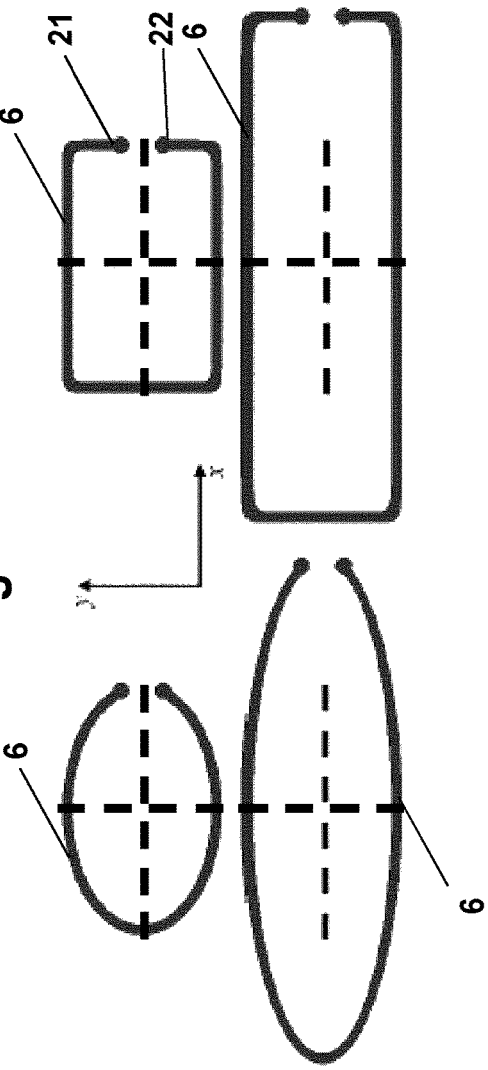
FIG. 5 illustrates a plurality of exemplary loop geometries that are based on the super ellipse equation.

As specific examples of coupler loop geometries, a plurality of coupler loops having super elliptical shapes with different parameters are illustrated in FIG. 5. Super elliptical shapes suitable for non-limiting embodiments are parametrically defined in Cartesian coordinates x and y in accordance with the equations $$x = a|\cos\theta|^{\frac{2}{m}}\operatorname{sgn}(\cos\theta) \quad y = b|\sin\theta|^{\frac{2}{n}}\operatorname{sgn}(\sin\theta)$$
$$a, b > 0 \quad m, n \geq 2 \quad \theta \in [0, 2\pi].$$

In these equations, parameters a (length) and b (height) are of a length dimension and define the size of the super ellipse in the x- and y-dimensions, respectively (thus being a generalization of the half axes of an ordinary ellipse) while parameters n and m define the curvature, i.e. the deviation from an ordinary ellipse (n=m=2) towards a rectangular shape (for n, m>2). θ is the variable parameter of the parametric representation of the curve.

In FIG. 5, for a, parameter values of a=7.5 mm (millimeters) (upper examples) and a=15.5 mm (lower examples) have been illustrated. b has been set fixed to b=4.6 mm in all examples. For n and m, values of n=m=2 (left-hand side examples) and n=m=20 (right-hand side examples) were used. The dashed lines indicate the symmetry axes. The dual symmetry axis is common for the super elliptical shape.

From an electrical perspective, due to the strongly constrained electromagnetic field, the coupler loop input at the terminals is well approximated by a function which only depends on the length and trace width of the loop, and not the shape. Thus, there are many other asymmetrical shapes not covered by this particular geometric form, which are possible candidates for efficient reactive near field coupling, and the loop is not limited to the particular geometric shape illustrated in FIG. 5.

As simulations show, if the length dimension of the loop (x-axis of FIG. 5) becomes so large that the transmission line loop of the coupler also covers the inlay antenna (radiator) of an RFID tag brought into close vicinity of the coupler, besides the coupling with the current loop of the inlay, also coupling with the inlay antenna becomes important. This may lead to destructive interference.

Figure 6:
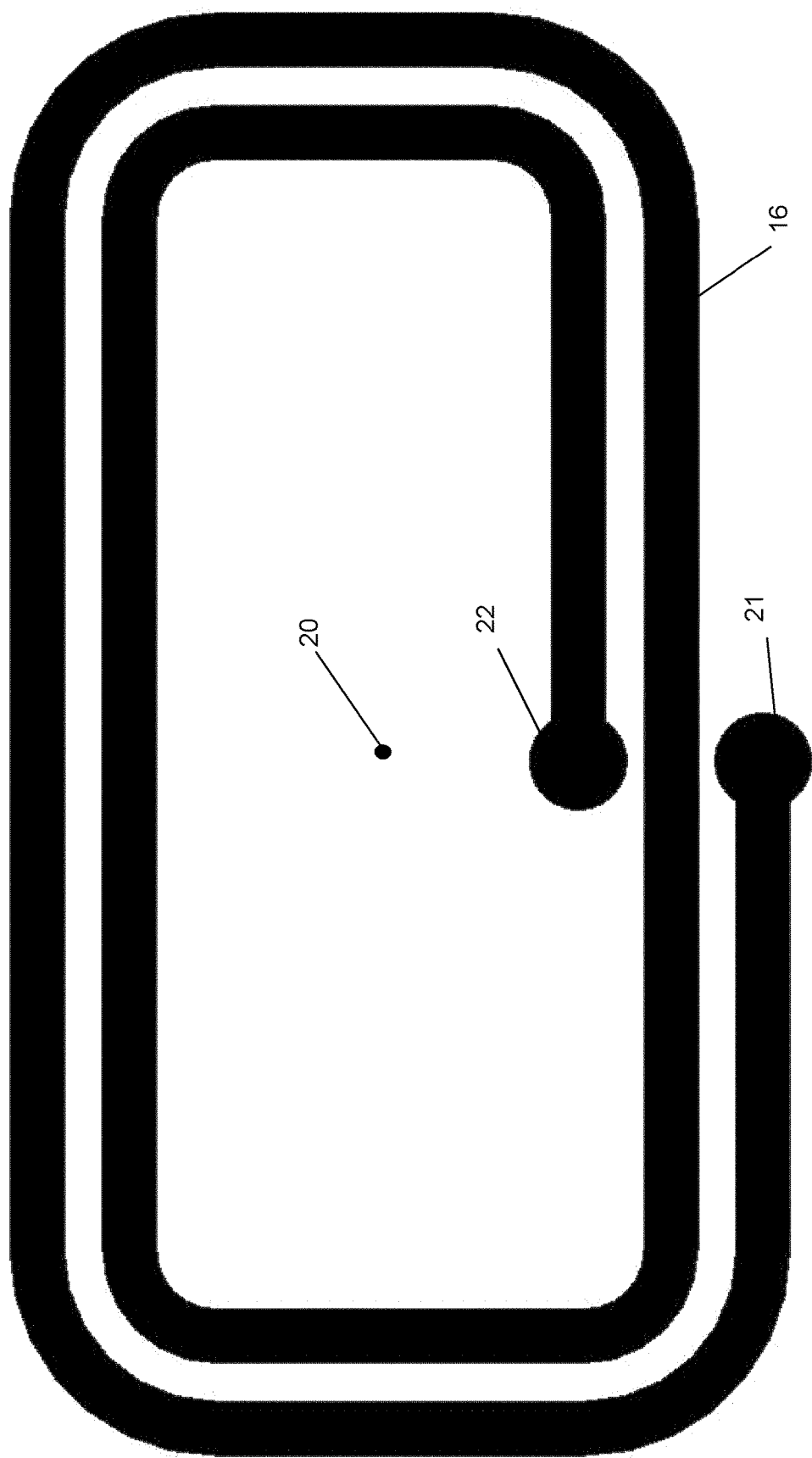
FIG. 6 illustrates an exemplary geometry of a coupling element having an elongated spiral planar shape.

FIG. 6 illustrates an alternative geometric shape of a coupling element. The shape of the coupling element illustrated in FIG. 6 differs from the DTLL shapes described before in that the actual coupling element comprises not only a single loop but has a more complex shape, wherein a transmission line 16 is wound several times around a fixed center 20 so that there is at least one winding of the transmission line between the two differentially fed terminals. This shape may be called an "elongated spiral shape".

More specifically, the transmission line of an elongated spiral shape used as a coupling element in the example of FIG. 6 is a continuous transmission line 16 of finite length with terminals 21 and 22 on both ends, wound around a fixed center 20 and formed into a planar shape. Each winding comprises straight portions that are arranged parallel to each other and the terminals are located so that there is at least one winding of the transmission line in-between. The illustrated shape is thus similar to a "spiral" but differs from the actual geometric figure of a spiral (which is characterized by a distance from a center point continuously increasing with the length of the curve) in that it has (substantially) parallel "flattened", i.e. (substantially) straight portions. As will be explained in more detail below, it is these portions, which particularly contribute to an enhanced coupling efficiency. In the illustrated example, the substantially straight and substantially parallel portions are connected by curved portions. The two terminals 21 and 22 are arranged along a line that is perpendicular to the direction in which the transmission line 16 leaves the terminals 21 and 22.

The size of the coupler element (TLL) is highly dependent upon the electrical length of the transmission line forming the TLL. The electrical length of the transmission line (TL) portion being confined to the top surface of the multi-layer arrangement may not exceed 180° (one half wavelength), to avoid zero crossings of the current. As reference, a straight TL with 1 mm width on an FR4 substrate having a thickness of 1 mm has a 180° electrical length corresponding to approximately 92 mm of physical length. Hence, any TLL has a surface size restriction corresponding to this TL length. It shall be noted that for an arbitrary geometrical shape of the TLL, sub sections of the loop being very close to each other interact electromagnetically. Hence, the actual size of the TLL may be affected by the shape of it. For instance, a super elliptical shape may have a TL length being rather close to the reference straight TL. On the contrary, a spiral shape has several sub sections being close to each other. For any DTLL realization, the differential input impedance corresponding to a 180° electrical length has a real value.

As a consequence of the differential feeding at the terminals 21 and 22, at each instance of time the current direction in the elongated parallel portions of the transmission line pattern 16 is the same. This corresponds to a more evenly distributed current density and thus generated magnetic field over an extended area of the top surface layer (actually: the whole surface of the coupler) rather than only in the proximity of a single loop-shaped conductor. This enables an enhanced flexibility in achieving highly efficient coupling with RFID tags of various shapes. On the other hand, the same as with the transmission line loop structures described before, the field strength decreases rather quickly outside the area of the transmission line, so that the magnetic field remains confined to the area of the coupler surface only and high spatial selectivity is not affected.

For the sake of completeness, it is noted that a simple spiral shape (in its strict mathematical sense, i.e. without flattened elongated portions) would be suitable as a geometry of the coupling element according to the present disclosure. However, the particular advantage of an even current distribution over the top surface so as to achieve an enhanced flexibility regarding various RFID tag shapes would not be achieved thereby.

It is moreover emphasized that the above described exemplary geometric arrangements are merely examples for illustrative purposes and the present disclosure is by no means limited to these examples. Rather, any suitable differentially feeding the coupling element structure that a skilled person is aware of or will become aware of in the future is understood to be within the scope of the present disclosure.

In accordance with a further non-limiting embodiment, a multilayer electromagnetic coupler arrangement for coupling electromagnetic power to an electric current loop of an RFID tag of arbitrary geometric shape, by means of reactive near field coupling, is provided. The electromagnetic coupler arrangement comprises a top surface layer forming a top surface of the electromagnetic coupler arrangement to be arranged closest to an RFID tag which the electromagnetic power is to be coupled to. The top surface layer further comprises a transmission line (transmission line loop) of a spiral shape or an elongated spiral shape for achieving the electromagnetic coupling by inductive coupling with a current loop of the RFID tag. The transmission line loop of a spiral shape or an elongated spiral shape is a continuous transmission line of finite length having a spiral shape or an elongated spiral shape with terminals on both ends. The terminals are located so that there is at least one winding of the transmission line in-between. The electromagnetic coupler arrangement further comprises a metallic ground plane layer and a feeding layer for feeding the two terminals.

In accordance with non-limited preferred embodiments of the further non-limiting embodiment, the terminals are suitable to be differentially fed by signals equal in amplitude and 180° phase shifted.

Also preferably, the transmission line is a continuous transmission line of finite length of an elongated spiral shape, which is wound around a fixed center point so that each winding comprises straight portions that are arranged parallel to each other. Further preferably, the two terminals are arranged on a straight line extending perpendicularly to a direction in which the transmission line leaves the terminals. In accordance with preferred non-limiting embodiments, the elongated spiral shape is a planar shape.

It is noted that the foregoing has outlined some of the more pertinent non-limiting embodiments. It will be clear to those skilled in the art that modifications to the disclosed non-limiting embodiments can be effected without departing from the spirit and scope thereof. As such, the described non-limiting embodiments ought to be considered as merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiments being expressly contemplated herein so that a person of ordinary skill in the art would appreciate from this disclosure that features, elements and/or functions of one embodiment may be incorporated into another embodiment, as skilled in the art would appreciate from this disclosure that features, elements and/or functions of one embodiment may be incorporated into another embodiment as appropriate, unless described otherwise, above. Although the description is made for particular arrangements and methods, the intent and concept thereof may be suitable for and applicable to other arrangements and applications.

For instance, throughout the operation non-limiting embodiments described herein, the case has been described in detail wherein the connection of all coupling elements is initially, i.e. when the feeding of an unmodulated electromagnetic wave to be applied in the sensing state starts, in the non-activated state, i.e. the state where the path from the phase compensated differential transmission line to the coupling element is switched to the first (high) resistance value. However, the opposite case is possible within the framework of the present disclosure as well. In that case, the DC voltage at the harvester element quickly reaches a high level (beyond the first threshold), which may trigger the switch to switch the connection from the second (low) resistance value to the first (high) value and then the operation proceeds as described above.

For the sake of completeness, it is noted that the former alternative may not operate together with the structure as illustrated in FIG. 3. In that case, the harvester element may not sufficiently quickly trigger switching, because it is always connected to the higher resistance path.

Alternatively, within the framework of the present disclosure, the sensing state may be prepared while an inlay is already present and when the initial switching state is towards the higher resistance. In that case, the DC voltage at the harvester element, after an initial raise, may drop back down for one or several coupling elements establishing strong interaction with the inlay, which triggers the switch.

For a structure such as that illustrated in FIG. 2, it has been described that there may be a stability problem in that a coupling element once activated will become again deactivated already after a short period of time that is insufficient for a reliable encoding procedure. As a solution for avoiding this, it was proposed to choose the resistance values $R_1$ and $R_2$ which are not too different from each other. As an alternative solution, a time delay element may be considered, which delays the switching back to the high resistance state by a time that is sufficient for the intended coupling, in particular encoding, procedure.

In summary, the present disclosure relates to a wireless electromagnetic coupler arrangement for reactive near field coupling comprising a sequential array of coupling elements which are geometrically arranged one- or two-dimensionally. By means of feeding an unmodulated wave of electromagnetic energy to each of the coupling elements and a respective associated harvester element, in an initial sensing state, an automatic selection of a single coupling element or plural coupling elements which establish a particularly strong and efficient interaction with an inlay is performed. By means of a respective feedback loop, a switchable array of resistances is used to activate the selected coupling element(s) for coupling of information to/from the loop and to de-activate the remaining coupling elements. The self adaptive array of coupling elements according to the present disclosure is flexibly applicable for coupling to planar metallic traces (in particular: RFID inlays) of arbitrary geometric shape without the need for a specific calibration or location procedure. There is no need for scanning the inlay geometry ("inlay profiling") or for external control either.

The invention claimed is:

1. A wireless electromagnetic coupler arrangement for providing spatial selectivity in interaction with an RF terminated planar metallic trace of arbitrary geometric shape by means of electromagnetic energy, the electromagnetic coupler arrangement comprising:
a sequential array of coupling elements shunted onto a differential transmission line, for coupling the electromagnetic energy to the RF terminated planar metallic trace by means of reactive near field coupling; and
a plurality of switchable resistor elements being included in the paths between the differential transmission line and a respective one of the coupling elements-forming the array, so as to alternatively switch the resistance of the electric connection between the differential transmission line and the respective coupling element to a first or a second value, the second value being smaller than the first value, by controlling a respective switch;
wherein each of the coupling elements is associated with:
a respective harvester element for collecting energy that is fed from the differential transmission line; and
a respective feedback loop for providing feedback from the harvester element to the respective switch for switching the resistor elements included in the respective path based on a DC voltage established at the harvester element.

2. An electromagnetic coupler arrangement according to claim 1, wherein an electric connection between each of the harvester elements and the differential transmission line being alternatively switchable between an electric connection with the first resistance value and an electric connection with the second resistance value, together with the electric connection between the differential transmission line and the respective coupling element.

3. An electromagnetic coupler arrangement according to claim 1, wherein each of the harvester elements being permanently coupled to the differential transmission line via an electric connection with the first resistance value.

4. An electromagnetic coupler arrangement according to claim 1, further comprising an interrogator for feeding electromagnetic energy to be coupled to the planar metallic trace.

5. An electromagnetic coupler arrangement according to claim 4, further comprising a balun that is electrically coupled between the interrogator and the differential transmission line, the balun forming a differential transmission line input by splitting an output of the interrogator in two parts equal in amplitude and shifted by 180° in phase.

6. An electromagnetic coupler arrangement according to claim 4, wherein the interrogator is configured to feed unmodulated electromagnetic energy to the coupling elements in a sensing state, the unmodulated electromagnetic energy being an RF carrier wave guided by the differential transmission line, in which the resistance is initially switched to the first value, for all coupling elements of the array.

7. An electromagnetic coupler arrangement according to claim 6, wherein the interrogator is configured to subsequently modulate the RF carrier as a communication signal to the coupling elements.

8. An electromagnetic coupler arrangement according to claim 7, wherein the interrogator is configured to feed the communication signal after a stable switching state of each of the switches has been established in view of the interaction between the unmodulated RF carrier and the RF terminated planar metallic trace.

9. An electromagnetic coupler arrangement according to claim 1, wherein the differential transmission line is terminated.

10. An electromagnetic coupler arrangement according to claim 1, wherein each of said coupling elements including a transmission line loop for interacting with the RF terminated planar metallic trace by inductive coupling, the transmission line loop being a continuous transmission line of finite length formed into a loop so that two terminals thereof approach each other and are differentially fed through the differential transmission line.

11. An electromagnetic coupler arrangement according to claim 10, wherein the transmission line loop has a super elliptic shape geometry in accordance with the parametric representation:

$$x = a|\cos\theta|^{\frac{2}{m}}\mathrm{sgn}(\cos\theta) \quad y = b|\sin\theta|^{\frac{2}{n}}\mathrm{sgn}(\sin\theta)$$
$$a, b > 0 \quad m, n \geq 2 \quad \theta \in [0, 2\pi],$$

wherein x and y are Cartesian co-ordinates.

12. An electromagnetic coupler arrangement according to claim 1, wherein each of the coupling elements comprising a transmission line pattern of an elongated spiral planar shape for interacting with the RF terminated planar metallic trace by inductive coupling, wherein the transmission line pattern of an elongated spiral shape being a continuous transmission line of finite length having an elongated spiral shape with terminals on both ends, wherein the terminals are located so that there is at least one winding of the transmission line in-between.

13. An electromagnetic coupler arrangement according to claim 12, wherein the continuous transmission line of finite length is wound around a fixed center point so that each winding comprises straight portions that are arranged parallel to each other.

14. An electromagnetic coupler arrangement according to claim 1, wherein the sequential array of coupling elements being of a one-dimensional geometric arrangement.

15. An electromagnetic coupler arrangement according to claim 1, wherein the sequential array of coupling elements being of a two-dimensional geometric arrangement.

16. An electromagnetic coupler arrangement according to claim 1, wherein the RF terminated planar metallic trace is an RFID inlay.

17. An electromagnetic coupler arrangement according to claim 16, adapted to encode the RFID inlay by coupling electromagnetic power thereto.

18. An electromagnetic coupler arrangement according to claim 1, wherein the resistance is switched to the first value when the DC voltage exceeds a predetermined first threshold value.

19. An electromagnetic coupler arrangement according to claim 1, wherein the resistance is switched to from the first to the second value when the DC voltage decreases below a predetermined second threshold value, the second threshold value being lower than the first threshold value.

20. An electromagnetic coupler arrangement according to claim 1, wherein each of the feedback loops includes an inverting operational amplifier.

21. An RFID printer/encoder comprising an electromagnetic coupler arrangement according to claim 1.

* * * * *